United States Patent
Komatsu et al.

(10) Patent No.: US 8,611,000 B2
(45) Date of Patent: Dec. 17, 2013

(54) ELECTRO-OPTICAL DISPLAY DEVICE AND PROCESS FOR MANUFACTURING THE SAME

(75) Inventors: Harunobu Komatsu, Matsumoto (JP); Kozo Shitagami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/205,156

(22) Filed: Aug. 8, 2011

(65) Prior Publication Data
US 2012/0062981 A1 Mar. 15, 2012

(30) Foreign Application Priority Data
Sep. 14, 2010 (JP) ................. 2010-205622

(51) Int. Cl.
G02B 26/00 (2006.01)

(52) U.S. Cl.
USPC .......................................................... 359/296

(58) Field of Classification Search
USPC .................. 359/296, 265–275; 345/105, 107; 430/32, 34, 38; 204/600, 450
See application file for complete search history.

(56) References Cited

U.S. PATENT DOCUMENTS

| 5,042,919 | A   | * | 8/1991  | Yabu et al. ..................... 349/150 |
| 7,800,813 | B2  | * | 9/2010  | Wu et al. ........................ 359/296 |
| 2002/0075556 | A1 |   | 6/2002  | Liang et al. |
| 2005/0259313 | A1 | * | 11/2005 | Wang et al. .................... 359/296 |
| 2010/0156779 | A1 | * | 6/2010  | Park et al. ..................... 345/107 |

FOREIGN PATENT DOCUMENTS

| JP | A-2004-004773 | 1/2004 |
| JP | A-2008-107484 | 5/2008 |

* cited by examiner

Primary Examiner — Tuyen Tra
(74) Attorney, Agent, or Firm — Oliff & Berridge, PLC

(57) ABSTRACT

An electro-optical display device includes a first substrate having an pixel electrode, a light-transmissive second substrate having a light-transmissive counter electrode, an electrophoretic layer interposed between the first substrate and the second substrate and having a liquid dispersion, a partition wall that defines a plurality of reservoirs containing the dispersion and a light-transmissive sealing layer that is provided between the partition wall and the counter electrode so as to seal the dispersion, and a light-transmissive hot melt conductive adhesive layer provided between the sealing layer and the counter electrode.

10 Claims, 6 Drawing Sheets

ELECTRO-OPTICAL DISPLAY DEVICE AND PROCESS FOR MANUFACTURING THE SAME

BACKGROUND

1. Technical Field

The present invention relates to electro-optical display devices and processes for manufacturing the same.

2. Related Art

It is generally known that when an electric field is applied to a dispersion of charged fine particles in a liquid, the fine particles are caused to migrate (are electrophoresed) in the dispersion by the Coulomb force. This phenomenon is referred to as electrophoresis.

Electrophoretic display devices utilize electrophoresis for displaying desired information (images). The electrophoretic display devices have memory characteristics, i.e., retain the image after voltage application is terminated. They also possess a wide viewing angle range and can display a high-contrast image with low power consumption.

Further, the electrophoretic display devices are non-emissive and thus do not cause severe eye fatigue as experienced with emissive display devices such as cathode ray tube displays. JP-A-2008-107484 and JP-A-2004-04773 disclose electrophoretic display devices having a partitioned structure in which a pair of substrates sandwich a partition wall that defines a plurality of spaces (hereinafter, also referred to as cells), and a dispersion of charged fine particles is enclosed within the cells.

The partitioned electrophoretic display device is obtained by supplying a dispersion into cells that are defined by a partition wall on an element substrate having a pixel electrode, and bonding a counter substrate having a counter electrode onto the surface opposite the element substrate. An adhesive is often used in the bonding of the substrates. However, the use of an adhesive involves posttreatment in order to, for example, remove the adhesive that has leaked on the outer surface.

Further, the adhesive can contaminate the dispersion, thereby preventing the device from achieving the desired electrophoretic performance. The production is otherwise such that the dispersion is supplied into the partitioned cells and is enclosed within the cells by a sealing layer, and thereafter the substrates are bonded to the appropriate surfaces with an adhesive. In such a case, the sealing layer is dissolved by the heat that is applied for the bonding, and the dissolution permits the dispersion to penetrate into the sealing layer, resulting in a degraded sealing performance.

SUMMARY

Advantages of some aspects of the invention are that highly reliable electro-optical display devices are provided which are producible with an improved efficiency in the bonding of substrates, and that processes for producing such electro-optical display devices are provided.

An electro-optical display device according to an aspect of the invention includes a first substrate having a first electrode, a light-transmissive second substrate having a light-transmissive second electrode, an electrophoretic layer interposed between the first substrate and the second substrate, the electrophoretic layer having a liquid electro-optical material, a partition wall that defines a plurality of reservoirs containing the electro-optical material, and a light-transmissive sealing layer that is provided between the partition wall and the second electrode so as to seal the electro-optical material, and a light-transmissive hot melt conductive adhesive layer provided between the sealing layer and the second electrode.

According to the above configuration, the electrophoretic layer and the second substrate (counter substrate) are laminated through the hot melt conductive adhesive layer. That is, the partition wall and the electrophoretic layer can be bonded with the counter substrate quickly by a simple technique utilizing heat.

The thermoplastic hot melt conductive adhesive layer is formed between the sealing layer and the second substrate (second electrode) without any clearance. Since this adhesive layer has conductivity, forming the hot melt conductive adhesive layer in this manner ensures electrical conduction between the second electrode and the electrophoretic layer.

Further, the hot melt conductive adhesive layer has light transmission properties and thus allows the second substrate side to constitute a display surface side (a visual side).

In an embodiment, the hot melt conductive adhesive layer softens at a temperature in the range of 80° C. to 100° C.

According to this embodiment, the hot melt conductive adhesive layer can be softened at a relatively low temperature (a temperature lower than the dissolution temperature of the sealing layer) as described above. Accordingly, the sealing layer is prevented from being dissolved when the electrophoretic layer and the counter substrate are laminated through the hot melt conductive adhesive layer. Further, preventing the dissolution of the sealing layer also prevents the dispersion from penetrating into the sealing layer and consequent degradations in the sealing performance. Further, the evaporation of the liquid dispersion medium in the electrophoretic layer is also prevented.

In an embodiment, the hot melt conductive adhesive layer preferably has a resistivity in the thickness direction of not more than 1000 Ω, and more preferably not more than 500 Ω.

According to this embodiment, conductivity between the electrophoretic layer and the second electrode is obtained though the hot melt conductive adhesive layer having conductivity in the thickness direction.

In an embodiment, the hot melt conductive adhesive layer has a thickness in the range of 1 μm to 50 μm.

If the thickness of the hot melt conductive adhesive layer is larger than the above range, it is difficult to obtain an electrical conduction between the first substrate side and the second electrode. The hot melt conductive adhesive layer having the thickness according to this embodiment reliably provides an electrical conduction between the first substrate side and the second electrode. Further, such a conductive adhesive layer may be easily provided on the second substrate (second electrode) in the production of the device.

In another embodiment, the hot melt conductive adhesive layer may be formed of a material including a mixture of a binder resin and a conductive material.

According to this embodiment, the hot melt conductive adhesive layer achieves conductive properties as well as adhesive properties.

In an embodiment, the content of the conductive material is 5 to 50 wt %.

According to this embodiment, the hot melt conductive adhesive layer achieves high conductive properties while ensuring good adhesive properties.

A process for manufacturing electro-optical display devices according to an aspect of the invention includes providing a partition wall having a plurality of spaces that are open on one surface side, supplying a liquid electro-optical material into the spaces in the partition wall, and forming a sealing layer on the open side of the partition wall in which the electro-optical material has been supplied in the spaces, thereby forming an electrophoretic layer, and further includes laminating a first substrate having a pixel electrode to the electrophoretic layer, and laminating a second substrate having a second electrode to the open side of the partition wall through a hot melt conductive adhesive layer that has been melted by heating.

According to the above aspect, the electrophoretic layer and the second substrate having the second electrode are laminated through the hot melt conductive adhesive layer that has been melted by heating. That is, they can be bonded quickly by a simple technique utilizing heat. Further, the hot melt conductive adhesive layer that has been melted by heating spreads between the electrophoretic layer and the second electrode without any clearance, thereby ensuring electrical conduction between the first substrate side and the second substrate side.

In an embodiment, the laminating of the second substrate is performed at a lamination temperature in the range of 80° C. to 100° C.

The lamination at an excessively high temperature may cause the sealing layer to be dissolved or the electro-optical material to be evaporated.

By using the hot melt conductive adhesive layer that can be melted (can soften) at a relatively low temperature as described above, the dissolution of the sealing layer or the evaporation of the electro-optical material during the lamination can be prevented.

In an embodiment, the process may include forming the hot melt conductive adhesive layer by supplying a hot melt conductive adhesive film onto the surface of the second electrode opposite the second substrate.

According to this embodiment, the hot melt conductive adhesive layer can be supplied stably on the second substrate (second electrode). Unlike a liquid adhesive, the hot melt conductive adhesive film does not squeeze out after the lamination, thereby permitting high workability.

In an embodiment, the process may include forming the sealing layer on the open side of the partition wall in which the electrophoretic layer is formed in the spaces.

According to this embodiment, the electrophoretic layer is sealed in the spaces. Since the electrophoretic layer does not have a direct contact with the second electrode according to this embodiment, the second electrode is prevented from corrosion by contact with, for example, the dispersion medium forming the electrophoretic layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
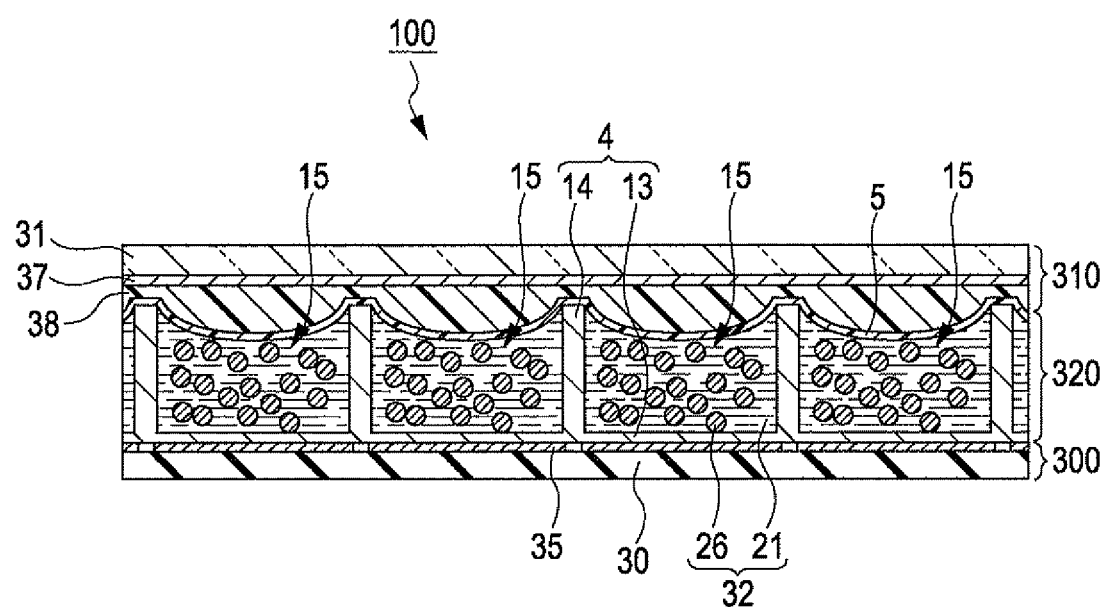
FIG. 1 is a sectional view illustrating a schematic structure of an electrophoretic display device as an example of an electro-optical display device according to an embodiment of the invention.

Embodiments of the invention will be described below with reference to the accompanying drawings, in which the size of the members has been modified appropriately so that all the members are visible First Embodiment FIG. 1 is a sectional view illustrating a schematic structure of an electrophoretic display device as an example of an electro-optical display device according to an embodiment of the invention.

As illustrated in FIGS. 1 and 2, an electrophoretic display device (electro-optical display device) 100 includes an element substrate 300 that has a first substrate 30 and pixel electrodes (first electrode) 35, a counter substrate 310 that has a second substrate 31 and a counter electrode (second electrode) 37, and an electrophoretic layer (electro-optical layer) 320 that is interposed between these substrates.

On the first substrate 30, pixel transistors (for example, TFTs (not shown)) for respective pixels, the pixel electrodes 35 and a cell matrix 4 are provided.

The pixel transistors are connected to the respective pixel electrodes 35 through wires, and are configured such that a voltage can be applied selectively to the pixel electrodes 35 by switching on or off the pixel transistors.

The pixel electrodes 35 are made of, although not particularly limited to, ITO in a thickness of, for example, 50 nm.

The first substrate 30 may be a substrate composed of an insulating resin material such as polycarbonate (PC) or polyethylene terephthalate (PET) (namely, a resin substrate), or a glass substrate. The thickness thereof may be, for example, 0.5 nm.

For the production of a flexible electrophoretic display device 100, a flexible resin substrate will be selected. Since the pixel electrodes 35 and the first substrate 30 do not usually constitute the visual side, these members are not necessarily made of light transmissive materials and may be formed of non-light transmissive materials.

The pixel electrodes 35 are formed on the side of the element substrate 300 which is opposite the electrophoretic layer 320. The counter electrode 37 is formed on the side of the counter substrate 310 which is opposite the electrophoretic layer 320 (see FIG. 1). For example, the pixel electrodes 35 are formed for respective pixels, and the counter electrode 37 is formed mutually for a plurality of the pixels. The pixel electrodes 35 and the counter electrode 37 are composed of, for example, poorly light-transmissive (untransparent) conductive layers such as aluminum (Al) or light-transmissive conductive layers such as indium tin oxide (ITO).

In the case where the first substrate 30 is a transparent substrate and the pixel electrodes 35 are formed of a light-transmissive material such as ITO, characters, images and other information displayed on the surface are visible through the element substrate 300. When the second substrate 31 is a transparent substrate and the counter electrode 37 is formed of a light-transmissive material such as ITO, characters, images and other information displayed on the surface are visible through the counter substrate 310.

The electrophoretic layer 320 has the cell matrix 4, a plurality of electrophoretic particles (electro-optical material) 26, a dispersion 32 (electro-optical material) of the electrophoretic particles 26 in a dispersion medium 21 (electro-optical material), and a sealing layer 5. The electrophoretic particles 26 are, for example, pigment particles, resin particles or particles of a composite material formed of these materials. Exemplary pigments that constitute the pigment particles include black pigments such as aniline black and carbon black, and white pigments such as titanium oxide and antimony oxide. Examples of the resin materials constituting the resin particles include acrylic resins, urethane resins, urea resins, epoxy resins, polystyrenes and polyesters. Examples of the composite particles include pigment particles that have been surface-coated with resin materials or other pigments, resin particles that have been surface-coated with pigments, and particles composed of a mixture containing pigments and resin materials in an appropriate composition ratio. The electrophoretic particles 26 formed of these materials are dispersed in the dispersion medium as positively or negatively charged particles.

The dispersion medium 21 is, for example, a lipophilic hydrocarbon solvent, with examples including the Isopar (registered trademark) series. That is, the dispersion medium 21 may be a fluid containing any one of Isopar E, Isopar G, Isopar H, Isopar L and Isopar M, a mixture of two or more of these Isopar fluids, or a mixture of at least one of these Isopar fluids and another hydrocarbon solvent(s).

Examples of the dispersion media 21 further include aliphatic hydrocarbons such as pentane, hexane and octane, alicyclic hydrocarbons such as cyclohexane and methylcyclohexane, aromatic hydrocarbons such as benzenes having a long-chain alkyl group (alkylbenzene derivatives), with specific examples including benzene, toluene, xylene, hexylbenzene, heptylbenzene, octylbenzene, nonylbenzene, decylbenzene, undecylbenzene, dodecylbenzene, tridecylbenzene and tetradecylbenzene, aromatic heterocyclic compounds such as pyridine, pyrazine, furan, pyrrole, thiophene and methylpyrrolidone, esters such as methyl acetate, ethyl acetate, butyl acetate and ethyl formate, ketones such as acetone, methyl ethyl ketone, diethyl ketone, methyl isobutyl ketone, methyl isopropyl ketone and cyclohexanone, nitriles such as acetonitrile, propionitrile and acrylonitrile, amides such as N,N-dimethylformamide and N,N-dimethylacetamide, carboxylic acid salts, and various oils. These media may be used singly or as a mixture.

The cell matrix 4 on the first substrate 30 (element substrate 300) has a plurality of spaces or cells (reservoirs) 15, which contain the dispersion 32 as the electrophoretic material.

For example, the cell matrix 4 is composed of a sheet (plate) member that has a plate base 13 and a lattice partition wall 14 on the base 13. The base 13 defines the bottom of the cell matrix 4 and is formed integrally with the partition wall 14 that is planar. The thickness of the base 13 is not particularly limited and may be in the range of about several micrometers (μm) to several tens of micrometers (μm). The partition wall 14 defines side walls of the cell matrix 4 so that the dispersion 32 as the electrophoretic material is contained in the plurality of reservoirs (cells 15). That is, the partition wall 14 provides a plurality of spaces (cells 15) that are partitioned on the element substrate 300, and the electrophoretic material is contained in each of the plurality of cells 15.

For example, the partition wall 14 has a square lattice shape, a hexagonal lattice shape or a triangular lattice shape in plan view.

Figure 2A:
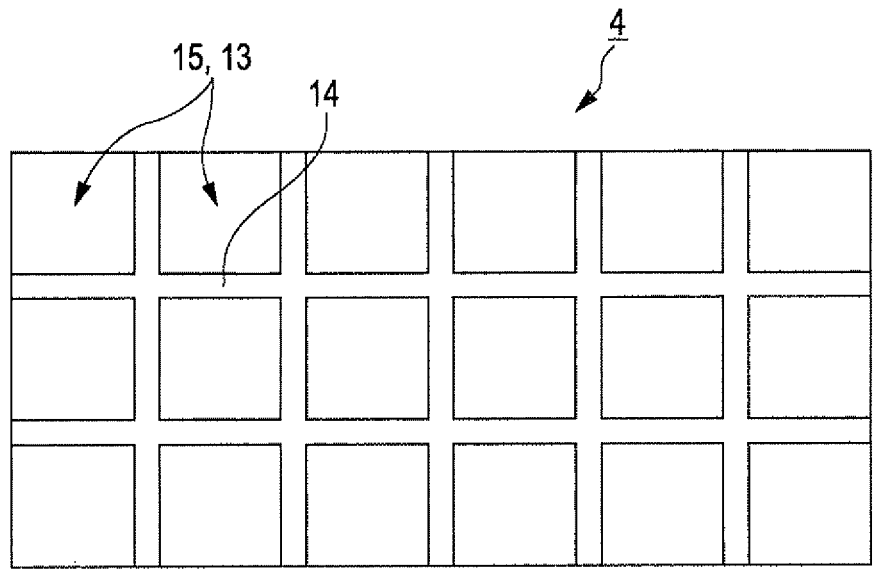
FIG. 2A is a plan view showing a structure of a cell matrix.
Figure 2B:
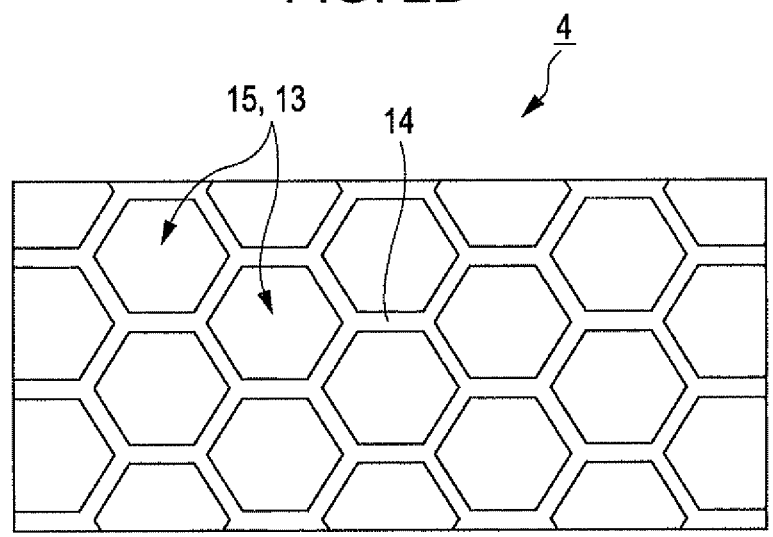
FIG. 2B is a plan view showing another structure of a cell matrix.

FIGS. 2A and 2B are plan views showing exemplary structures of the cell matrix.

When the partition wall 14 has a square lattice shape in plan view as illustrated in FIG. 2A, the planar shape of each cell 15 is square. When the partition wall 14 has a hexagonal lattice shape in plan view as illustrated in FIG. 2B, the planar shape of each cell 15 is hexagonal.

In this embodiment, the base 13 and the partition wall 14 constitute an integral cell matrix 4. However, the constitution of the cell matrix 4 is not limited thereto and may be such that the base 13 and the partition wall 14 are formed as separate members and are joined together. In another embodiment, the base 13 may be omitted and the cell matrix 4 may be composed of the partition wall 14 alone. In this case, the partition wall 14 may be attached directly on the uppermost layer of the element substrate 300 on the pixel electrode 35 side.

Since the base 13 and the partition wall 14 constitute an integral cell matrix 4 in this embodiment, the cell matrix 4 is formed of a single material. In the case where the base 13 and the partition wall 14 are formed separately, differing materials may be used.

The base 13 may be composed of a flexible material or a rigid material. Examples of the materials include resin materials such as epoxy resins, acrylic resins, urethane resins, melamine resins and phenolic resins, and ceramic materials such as silica, alumina and titania. For the production of a flexible electrophoretic display device 100, a flexible resin material will be selected for the base 13.

Examples of the materials for the partition wall 14 include resin materials such as epoxy resins, acrylic resins, urethane resins, melamine resins and phenolic resins, and ceramic materials such as silica, alumina and titania.

In this embodiment, it is preferable that the partition wall 14 be composed of a material that has high affinity for the dispersion 32 in the electrophoretic layer 320. For example, when the dispersion 32 is lipophilic, the partition wall 14 is preferably composed of a lipophilic material. In this case, the partition wall 14 may be made of a lipophilic material, or only the surface thereof may be rendered lipophilic. For example, the surface of the partition wall 14 may be lipophilized by surface treatment (in which a lipophilic layer is formed on the surface of the partition wall 14 by a method such as coating, physical vapor growth technique or chemical vapor growth technique, or a lipophilic film is attached onto the surface).

In an embodiment, it is preferable that the dispersion medium 21 and the partition wall 14 have a contact angle θ of $0°<θ<20°$. According to this configuration, the adhesion between the dispersion medium 21 and the partition wall 14 is increased to ensure that the surface of the electrophoretic layer 320 is concave with respect to the cross section of each cell 15.

The sealing layer 5 seals (encloses) the dispersion 32 as the electrophoretic material within each of the cells 15. The sealing layer 5 is formed in a uniform thickness on the open side of the partition wall 14 along the surface of the dispersion 32. As illustrated in FIG. 1, the sealing layer 5 follows the concave contour of the surface of the dispersion 32 and reflects it on its surface. The thickness of the sealing layer 5 is, for example, about 5 to 10 μm. For example, the sealing layer 5 may be composed of a water-soluble polymer. Specific examples of the materials include polyvinyl alcohols (PVAs), amino acids, gum arabic, arabic rubber, alginic acid derivatives, albumin, sulfoxymethyl cellulose, cellulose derivatives, gelatin, polyethylene oxide, polystyrenesulfonic acid, polyvinylpyrrolidone, polyvinylphenol, polyvinyl acetate derivatives and lecithin. These materials may be used singly, or two or more may be used in combination.

The hydrocarbon solvent (for example, Isopar) as the dispersion medium 21, and PVA are both inexpensive. Accordingly, the production costs for the electrophoretic display devices 100 may be reduced. Further, materials such as PVAs can give a colorless and transparent sealing layer 5 which has approximately 90% light transmittance. Since such a sealing layer 5 has low light attenuation, it is possible to increase the visibility of characters, images and other information displayed on the surface covered with the sealing layer 5 (namely, a collection of the cells 15).

The sealing layer 5 and the dispersion 32 have very low compatibility with each other. Thus, the sealing layer 5 can tightly enclose the dispersion 32 within the cells 15.

In this embodiment, the partition wall 14, the dispersion 32 and the sealing layer 5 constitute the electrophoretic layer 320.

The counter electrode 37 is provided to cover the entire surface of the second substrate 31. For example, the counter electrode 37 is ITO having a thickness of 100 nm and the second substrate 31 is a glass or PET substrate having a thickness of 0.5 μm. They both have light transmission properties.

On the surface of the counter electrode 37 (the surface opposite the second substrate 31), a light-transmissive hot melt conductive adhesive layer 38 is formed to cover the entire surface. The hot melt conductive adhesive layer 38 may be a film of a polymer material (a binder resin) which contains a predetermined amount of a metallic filler (a conductive material) 28. The thickness thereof is appropriately selected in the range of 1 μm to 50 μm.

Examples of thermoplastic polymers for use as hot melt materials include, but are not limited to, polyolefins (such as polyethylene, polypropylene, polybutylene and copolymers thereof), polytetrafluoroethylene, polyesters (such as polyethylene terephthalate), polyvinyl acetate, vinyl chloride/vinyl acetate copolymer, polyvinyl butyral, acrylic resins (such as polyacrylate, polymethyl acrylate and polymethyl methacrylate), polyamides (nylons), polyvinyl chloride, polyvinylidene chloride, polystyrenes, polyvinyl alcohols, polyurethanes, cellulose resins (such as cellulose nitrate, cellulose acetate, cellulose acetobutyrate and ethylcellulose), and copolymers of these materials (such as ethylene/vinyl acetate copolymer, ethylene/acrylic acid copolymer and styrene/butadiene block copolymer).

Examples of the transparent metallic fillers 28 include glass beads that have been surface-treated with inorganic salts such as lithium chloride and magnesium chloride, silicon compounds resulting from the hydrolysis of chlorosilanes and silicon tetrachloride, metal oxide powders, indium (tin) oxide and tin (antimony) oxide. The content of the transparent metallic filler 28 may be 5 wt % to 50 wt %.

The polymer materials and the transparent metallic fillers 28 are not limited to those described above.

In the electrophoretic display device 100, the hot melt conductive adhesive layer 38 is curved outward toward the electrophoretic layer 320 in each of the cells 15. That is, as illustrated in FIG. 1, the lower surface of the hot melt conductive adhesive layer 38 (on the electrophoretic layer 320 side) is convex in each of the cells 15.

Processes for manufacturing electrophoretic display devices

Next, processes for manufacturing the above electrophoretic display devices will be described.

Figure 3A:
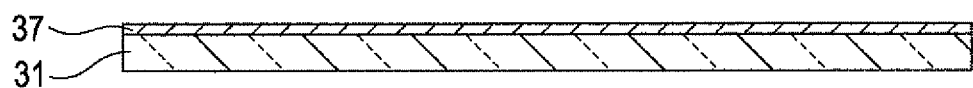
FIGS. 3A and 3B illustrate steps of producing a counter substrate side.

FIGS. 3A to 5B are sectional views that illustrate a process for manufacturing the electrophoretic display device 100 according to the first embodiment. FIGS. 3A and 3B show steps for producing the counter substrate side. FIGS. 4A to 5B show steps for producing the element substrate side.

As illustrated in FIG. 3A, an ITO material is applied onto substantially the entire surface of the second substrate 31 which is a resin substrate or a glass substrate, thereby forming the counter electrode 37.

Figure 3B:
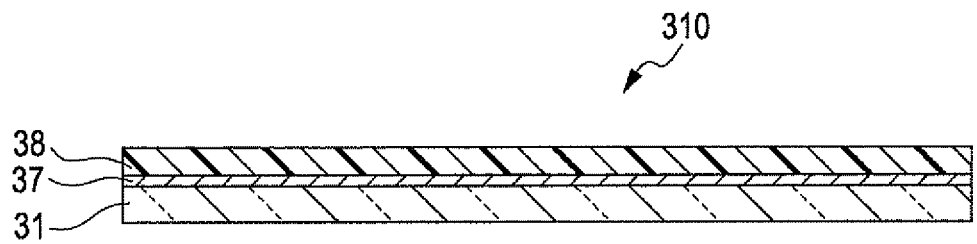

Next, as illustrated in FIG. 3B, a hot melt conductive adhesive film is supplied to form the hot melt conductive adhesive layer 38 on substantially the entire surface of the counter electrode 37. This hot melt conductive adhesive layer 38 is an adhesive film in which the transparent metallic filler 28 is dispersed in a thermoplastic polymer that is solid at room temperature. The electrical resistivity in the thickness direction of the hot melt conductive adhesive layer 38 is preferably not more than 1000 Ω, and more preferably not more than 500 Ω.

The counter substrate 310 is formed as described above. In an embodiment, a release sheet may be applied to the surface of the hot melt conductive adhesive layer 38 (the outer surface opposite the counter electrode 37).

Figure 4A:
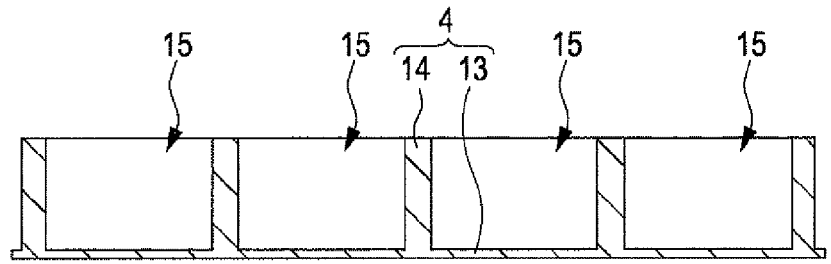
FIGS. 4A to 4D illustrate steps of producing an element substrate side.

Next, as illustrated in FIG. 4A, the cell matrix 4 is provided which has a plurality of cells 15 that are open on one side thereof.

Figure 4B:
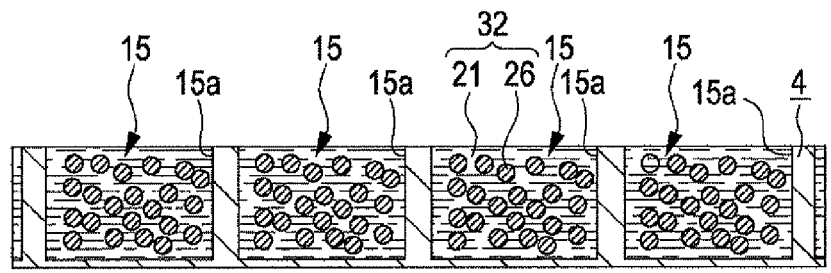

As illustrated in FIG. 4B, the dispersion 32 (a dispersion of the electrophoretic particles 26 in the dispersion medium 21) is supplied into each of the cells 15 of the cell matrix 4 through an opening 15a of each cell 15. The dispersion 32 may be supplied to each cell 15 by various methods such as a dropping method using a dispenser, an ink jet method (a droplet discharge method), a spin coating method and a dip coating method. Of these methods, a dropping method or an ink jet method is preferably adopted. According to a dropping method or an ink jet method, the dispersion 32 can be supplied selectively and more reliably to the cells 15 (reservoirs) without wasting the dispersion 32.

Figure 4C:
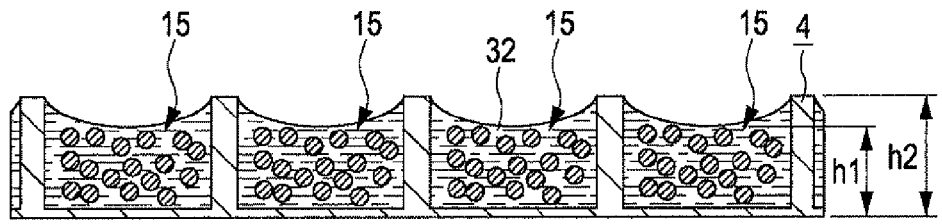

It is preferable that a certain waiting time be allowed after the dispersion 32 is supplied to the cells 15. In such a manner, as illustrated in FIG. 4C, the surface (liquid level) of the dispersion 32 at a central area in each cell 15 decreases and the dispersion 32 has a concave cross section.

Figure 6:
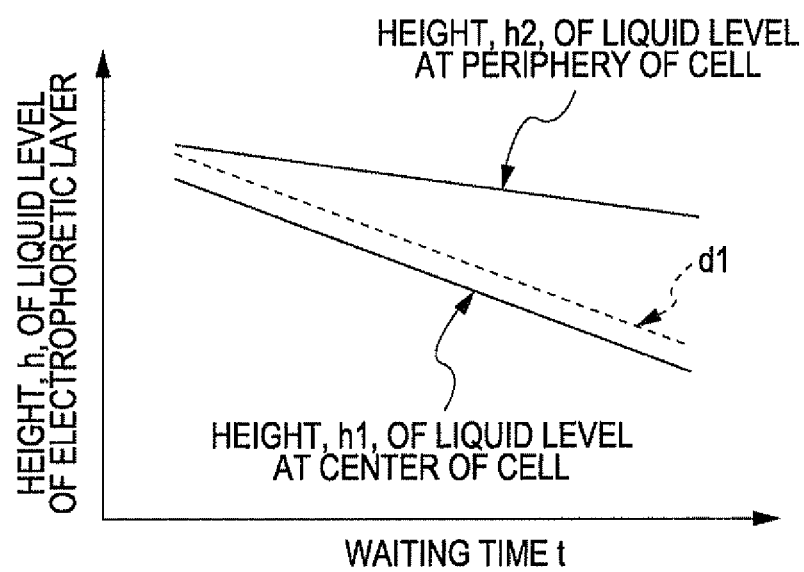
FIG. 6 is a diagram showing relations between the liquid level height in an electrophoretic layer and the waiting time.

FIG. 6 is a diagram showing the relations between the liquid level height of the dispersion 32 and the waiting time.

As shown in FIG. 6, there is a correlation between the liquid level height of the dispersion 32 supplied in the cell 15, and the waiting time after the supply of the dispersion 32. The diagram shows that the liquid level height decreases with increasing waiting time.

Further, the tendency for the liquid level to decrease is more prominent in the center of the cell 15 rather than in the periphery of the cell 15. That is, the liquid level height at the center of the cell 15 tends to decrease more quickly than the liquid level height of the dispersion 32 at the periphery of the cell 15. This tendency arises because the dispersion at the periphery of the cell 15 is in contact with the partition wall 14 and the liquid level of the dispersion 32 is maintained by the partition wall 14. The liquid at the center of the cell 15 does not have such a support.

Further, a higher adhesion between the dispersion 32 and the partition wall 14 tends to retard the decrease of the liquid level height of the dispersion 32 at the periphery of the cell 15. Accordingly, the decrease of the height h2 of the liquid level may be prevented by selecting the materials of the dispersion 32 and the partition wall 14 which have a high affinity for each other.

Here, the difference between h1 and d1 (the distance between the pixel electrode 35 and the hot melt conductive adhesive layer 38) gives the thickness of the sealing layer 5.

For example, when the dispersion 32 is lipophilic, the partition wall 14 may be composed of a lipophilic material.

According to this configuration, the dispersion 32 and the partition wall 14 achieve a high adhesion and the decrease of the liquid level height h2 is prevented. (The slope of the line for h2 versus waiting time t in FIG. 6 is more gradual.) The lipophilic dispersion 32 may be obtained by, for example, using a lipophilic hydrocarbon solvent (such as Isopar) as the dispersion medium 21. The adhesion between the dispersion medium 21 and the partition wall 14 may be also increased by selecting the materials such that the contact angle between the dispersion medium 21 and the partition wall 14 is in the range of $0° < \theta < 20°$. In this case, similarly, a lipophilic solvent and a lipophilic material may be selected for the dispersion medium 21 and the partition wall 14, respectively. More preferably, the materials are selected such that the contact angle $\theta$ between the dispersion medium 21 and the partition wall 14 is in the range of $0° < \theta < 10°$.

By controlling the duration of the waiting time based on the correlation illustrated in FIG. 6 as well as by selecting the materials of the dispersion 32 and the partition wall 14, the heights h1 and h2 of the liquid level of the dispersion 32 at the center and the periphery of the cell 15 may be controlled to the desired values. That is, the concave shape on the surface, the depth and other properties of the dispersion 32 may be controlled approximately to the desired configurations.

Figure 4D:
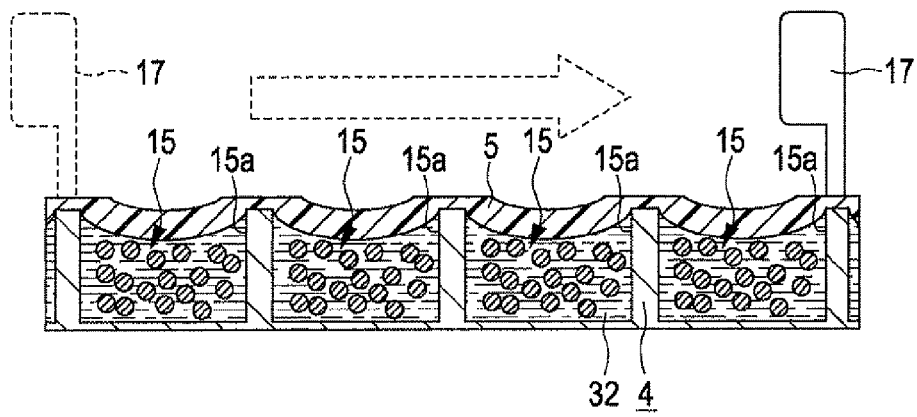

Next, as illustrated in FIG. 4D, the sealing layer 5 is formed so as to enclose the dispersion 32 in each of the cells 15. In detail, the sealing layer 5 is formed to cover the opening 15a side of the cell matrix 4 (partition wall 14) containing the dispersion 32, thereby encapsulating the dispersion 32 within each cell 15 of the cell matrix 4. For example, the sealing layer 5 may be formed by the following method.

A water-soluble polymer is dissolved in water or a hydrophilic liquid (for example, methanol or ethanol) to give a solution as a sealing liquid. In an embodiment, PVA as the water-soluble polymer is dissolved in water to give a sealing liquid having a concentration of 3 wt % to 40 wt % (percent by weight).

Next, the sealing liquid is applied onto the open side of the cell matrix 4 to form the sealing layer 5. The dispersion 32 is lipophilic and the sealing layer 5 is hydrophilic. That is, the dispersion 32 and the sealing layer 5 are immiscible. The sealing layer 5 that is formed on the exposed dispersion 32 in the cells 15 tightly encloses the dispersion 32 within the cells 15. Further, the dispersion 32 is prevented from having a direct contact with the counter electrode 37. Thus, the counter electrode 37 is prevented from corrosion by contact with the dispersion medium 21 of the dispersion 32.

In the application of the sealing liquid, the liquid may be spread with a squeegee 17 to form the sealing layer 5 evenly on the entire surface on the opening 15a side of the cell matrix 4 (partition wall 14). The application methods for the sealing liquid are not limited thereto and include methods using a die coater or a comma coater.

Figure 5A:
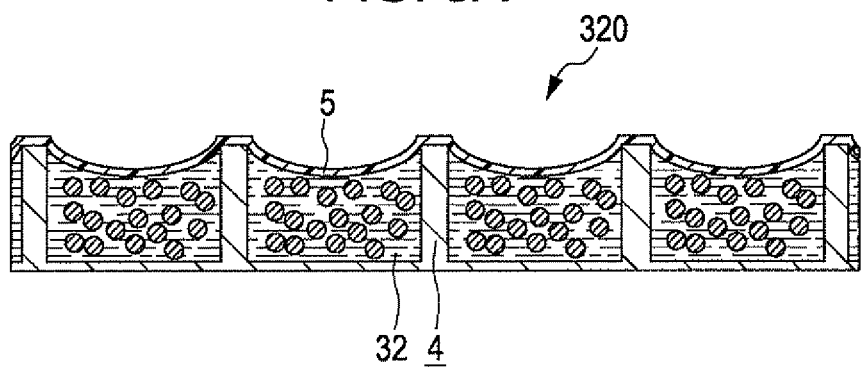
FIGS. 5A and 5B illustrate steps of producing an element substrate side.

Next, the sealing layer 5 formed by the application of the sealing liquid is subjected to a drying treatment and is hardened. For example, the sealing layer 5 is dried and hardened by being allowed to stand in an environment at room temperature to approximately 50° C. The drying treatment may require a varying time depending on the thickness of the sealing layer 5. For example, the drying treatment time is about several minutes to several hours. Since the PVA concentration in the sealing layer 5 is high, the sealing layer 5 may be dried naturally or at a relatively low temperature. In the drying treatment, the water contained in the sealing layer 5 is volatilized (evaporated). Consequently, as illustrated in FIG. 5A, the thickness of the sealing layer 5 is reduced compared to that immediately after the application. An electrophoretic layer 320 is thus formed.

Figure 5B:
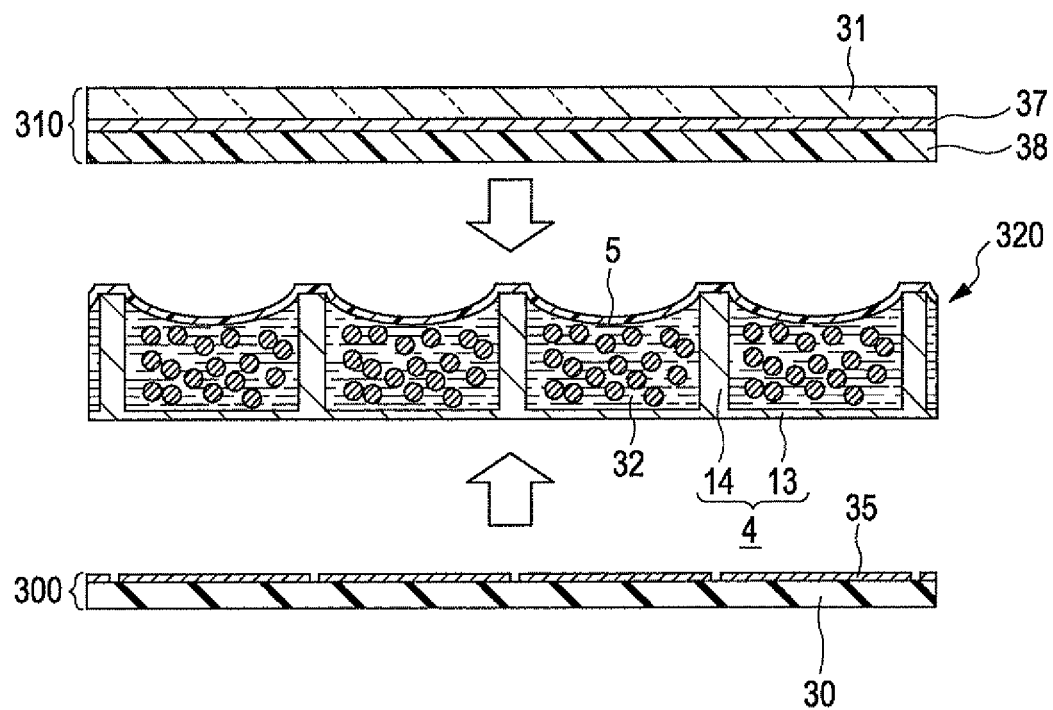

Next, as illustrated in FIG. 5B, there are provided the separately-formed element substrate 300 having the pixel electrodes 35 and the counter substrate 310 having the hot melt conductive adhesive layer 38.

Here, the element substrate 300 has the first substrate 30 that is a resin substrate or a glass substrate, and a plurality of selection transistors and pixel electrodes 35 on the first substrate 30. This substrate may be produced by a known process.

Next, the element substrate 300 and the counter substrate 310 are attached to the electrophoretic layer 320.

In this embodiment, the counter substrate 310, the electrophoretic layer 320 and the element substrate 300 are laminated (bonded) together by a vacuum lamination method.

First, as illustrated in FIG. 5B, the surface of the element substrate 300 on which the pixel electrodes 35 are formed is attached to the surface of the cell matrix 4 on the base 13 side. This attachment may be made using, for example, an adhesive (not shown).

The surface of the counter substrate 310 on which the hot melt conductive adhesive layer 38 is provided is attached to the surface of the cell matrix 4 on which the partition wall 14 and the cells 15 expose a plurality of openings. That is, the release sheet that has been attached on the surface of the hot melt conductive adhesive layer 38 is released, and the surface of the hot melt conductive adhesive layer 38 is brought into contact with the surface of the partition wall 14 (the sealing layer 5) and is melted by heating at a predetermined temperature of 80° C. to 100° C. while maintaining the contact with the partition wall 14 (the sealing layer 5). By the heating, the adhesive layer attains fluidity and spreads between the sealing layer 5 and the counter electrode 37 without any clearance to exhibit adhesion to both of these members. In this manner, the hot melt conductive adhesive layer 38 is melted and activated by heating, and the electrophoretic layer 320 and the counter substrate 310 are attached together instantaneously.

Thereafter, the molten conductive adhesive layer 38 is cooled and solidified. Thus, the electrophoretic layer 320 and the counter substrate 310 are bonded together.

The element substrate 300 and the counter substrate 310 are stacked with the electrophoretic layer 320 therebetween as described above, resulting in the electrophoretic display device 100 according to the aforementioned embodiment illustrated in FIG. 1.

According to the electrophoretic display device 100 in this embodiment, the counter substrate 310 is laminated (bonded) to the electrophoretic layer 320 through the hot melt conductive adhesive layer 38. That is, these members can be bonded together quickly by a simple technique utilizing heat.

In this embodiment, the dispersion 32 supplied in the cells 15 has a liquid level that is concave from the periphery to the center of the cell 15, and the sealing layer 5 is formed concave following the liquid level shape of the dispersion 32. Because of such a configuration, a setting adhesive that does not melt cannot fill in between the concave sealing layer 5 and the counter electrode 37, failing to achieve an electrical conduction between the counter substrate 310 and the element substrate 300. In contrast, the hot melt conductive adhesive layer 38 according to this embodiment can be melted by heating and fill in between the sealing layer 5 and the counter electrode 37 without any clearance, thereby reliably achieving an electrical conduction between the counter substrate 310 and the element substrate 300.

Further, the hot melt conductive adhesive layer 38 can bond the members with high adhesion and also has small changes with time, that is, the layer 38 has excellent anti-aging properties.

Furthermore, adhesives that are conventionally used are liquid and thus involve stirring to prevent the settling of the transparent metallic filler 28.

In contrast, the hot melt conductive adhesive layer 38 according to this embodiment is free of solvents. That is, the counter substrate 310 may be laminated to the electrophoretic layer 320 without leaving any excessive solvent which has squeezed out, thus eliminating the need of removing the solvent. According to the embodiment, the members may be laminated (bonded) simply without special treatments.

Furthermore, when a liquid adhesive is used, the adhesive or the solvent of the adhesive can dissolve the sealing layer 5. The dissolved portion of the sealing layer 5 can contaminate the dispersion 32 to adversely affect the electrophoresis of the electrophoretic particles 26, or bubbles can be trapped between the sealing layer 5 and the counter electrode 37.

In contrast, the hot melt conductive adhesive layer 38 according to this embodiment contains no solvents and does not dissolve the sealing layer 5. Thus, the electrophoretic particles 26 achieve the desired electrophoretic behavior, the bubbles are prevented from being present, and an electrical conduction between the counter substrate 310 and the element substrate 300 is reliably obtained.

Since the hot melt conductive adhesive layer 38 in the present embodiment is a film, it can be handled easily and can be supplied stably as an upper layer of the counter substrate 310. Further, the transparent metallic filler 28 in the film maintains a homogenous dispersibility.

The hot melt conductive adhesive layer 38 contains a large number of pieces of the transparent metallic filler 28 mixed therein, and thereby ensures an electrical conduction between the pixel electrodes 35 and the counter electrode 37.

Further, since the hot melt conductive adhesive layer 38 is composed of a light-transmissive material, the laminate side (the counter substrate 310 side) can constitute the display surface.

EXAMPLE 1

An electrophoretic display device in Example 1 has the following configuration:
Hot melt material: polyvinyl acetate (melting point 100° C.)
Metallic filler material: tin oxide
Thickness of hot melt conductive adhesive layer: 10 μm
Counter substrate: transparent conductive film (NXC1 manufactured by TORAY INDUSTRIES, INC.) in which indium tin oxide (ITO) is deposited on a polyester (PET) film
Lamination temperature: 80° C.
Applied pressure: 0.4 MPa

EXAMPLE 2

An electrophoretic display device in Example 2 has the following configuration:
Hot melt material: polyurethane (melting point 90° C.)
Metallic filler material: magnesium chloride
Thickness of hot melt conductive adhesive layer: 10 μm
Counter substrate: transparent conductive film (NXC1 manufactured by TORAY INDUSTRIES, INC.) in which indium tin oxide (ITO) is deposited on a polyester (PET) film
Lamination temperature: 85° C. (or may be the same as in Example 1)
Applied pressure: 0.4 MPa Electrophoretic display devices in Comparative Examples have the following configurations:

COMPARATIVE EXAMPLE 1

Hot melt material: acrylate-containing UV-curable adhesive (melting point 170° C.)→Comparative Example 1 results in the dissolution of the sealing layer 5.

COMPARATIVE EXAMPLE 2

Hot melt material: epoxy adhesive (melting point 150° C.)→Comparative Example 2 results in the dissolution of the sealing layer 5.

COMPARATIVE EXAMPLE 3

Hot melt material: none→In Comparative Example 3, a clearance is formed between the sealing layer 5 and the counter electrode 37, and the device does not operate.

Based on the above results, the dissolution of the sealing layer 5 can be prevented and good adhesion can be obtained by the use of the hot melt materials such as polyvinyl acetate and polyurethane that can be melted at low temperatures.

On the other hand, the sealing layer 5 is dissolved when the hot melt material is an acrylate-containing UV-curable adhesive or an epoxy adhesive that melts at a relatively higher temperature than that of the above materials. In such cases, adverse effects on the dispersion 32 are concerned, and the dispersion 32 as the electrophoretic material may be evaporated by high-temperature lamination.

Accordingly, the hot melt materials shown in Examples 1 and 2 that melt at low temperatures are advantageous.

The above embodiments described with reference to the attached drawings are only illustrative and do not limit the scope of the invention. It is within the artisan's skill to modify or adjust the invention without departing from the technical scope of the invention as claimed. Such modifications and adjustments are conceived to belong to the scope of the invention.

For example, the thickness of the hot melt conductive adhesive layer 38 is so determined that when the counter substrate 310 is laminated to the cell matrix 4 (the electrophoretic layer 320), the hot melt conductive adhesive layer 38 can fill in the space between the counter electrode 37 and the sealing layer 5 that is formed concave along the liquid level shape of the dispersion 32. However, an excessively large thickness is unsuited in view of electrical conduction between the counter electrode 37 and the pixel electrodes 35. For this reason, the thickness may be in the range of 1 μm to 50 μm, and preferably 10 μm to 20 μm.

The electro-optical display device described in the aforementioned embodiment is an electrophoretic display device. However, the invention may be applied to any electro-optical display devices that has an electro-optical layer, with examples including electro-optical apparatuses having TN (twisted nematic) liquid crystal displays, STN (super TN) liquid crystal displays, ferroelectric liquid crystal displays, cholesteric liquid crystal displays, toner displays and twist ball displays.

The entire disclosure of Japanese Patent Application No. 2010-205622, filed Sep. 14, 2010 is expressly incorporated by reference herein.

What is claimed is:
1. An electro-optical display device comprising:
a first substrate having a first electrode;

a light-transmissive second substrate having a light-transmissive second electrode;

an electrophoretic layer interposed between the first substrate and the second substrate, the electrophoretic layer having a liquid electro-optical material, a partition wall that defines a plurality of reservoirs containing the electro-optical material, and a light-transmissive sealing layer that is provided between the partition wall and the second electrode so as to seal the electro-optical material; and a light-transmissive hot melt conductive adhesive layer provided between the sealing layer and the second electrode, the light-transmissive hot melt conductive adhesive layer does not include solvent, and the light-transmissive hot melt conductive adhesive layer including conductive fillers, wherein said conductive filler is selected from: (1) glass beads that have been surface-treated with inorganic salts or (2) silicon compounds.

2. The electro-optical display device according to claim 1, wherein the light-transmissive hot melt conductive adhesive layer softens at a temperature in the range of 80° C. to 100° C.

3. The electro-optical display device according to claim 1, wherein the light-transmissive hot melt conductive adhesive layer has a resistivity in the thickness direction of not more than 1000 Ω.

4. The electro-optical display device according to claim 3, wherein the light-transmissive hot melt conductive adhesive layer has a resistivity in the thickness direction of not more than 500 Ω.

5. The electro-optical display device according to claim 1, wherein the light-transmissive hot melt conductive adhesive layer has a thickness in the range of 1 μm to 50 μm.

6. The electro-optical display device according to claim 1, wherein the light-transmissive hot melt conductive adhesive layer is formed of a material including a mixture of a binder resin and a conductive material.

7. The electro-optical display device according to claim 6, wherein the concentration of the conductive material is 5 to 50 wt % of the light-transmissive hot melt conductive adhesive layer.

8. A process for manufacturing electro-optical display devices, comprising:

providing a plurality of partition walls on a plate base having a plurality of spaces that are open on an opposite side of the base plate;

supplying a liquid electro-optical material into the spaces between the plurality of partition walls; and forming a sealing layer on the opposite side of the base plate through which the electro-optical material has been supplied into the spaces, thereby forming an electrophoretic layer;

laminating a first substrate having a pixel electrode to the base plate; and laminating a second substrate having a second electrode to the opposite side of the base plate through melting a light-transmissive hot melt conductive adhesive layer by heating, wherein the light-transmissive hot melt conductive adhesive layer does not include solvent, and the light-transmissive hot melt conductive adhesive layer includes conductive fillers, wherein said conductive filler is selected from: (1) glass beads that have been surface-treated with inorganic salts or (2) silicon compounds.

9. The process for manufacturing electro-optical display devices according to claim 8, wherein the laminating of the second substrate is performed at a lamination temperature in the range of 80° C. to 100° C.

10. The process for manufacturing electro-optical display devices according to claim 8, further comprising:

forming the light-transmissive hot melt conductive adhesive layer by supplying a hot melt conductive adhesive film to the surface of the second electrode opposite the second substrate.

* * * * *